Oct. 1, 1963  L. R. BLAKE  3,105,807
FUEL ELEMENTS FOR NUCLEAR REACTORS
Filed Jan. 11, 1960  2 Sheets-Sheet 1
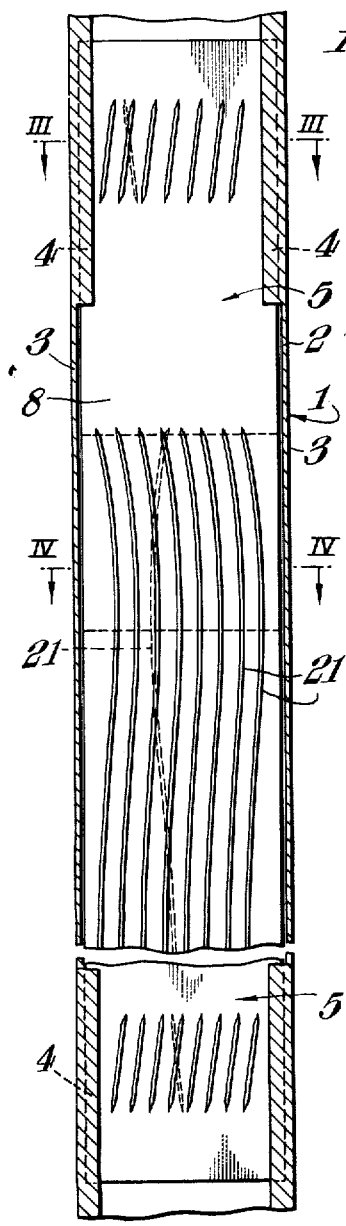
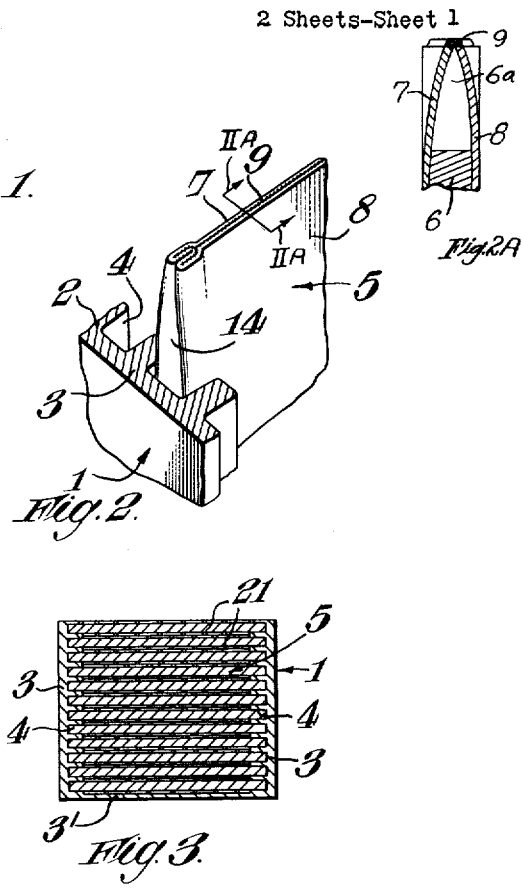
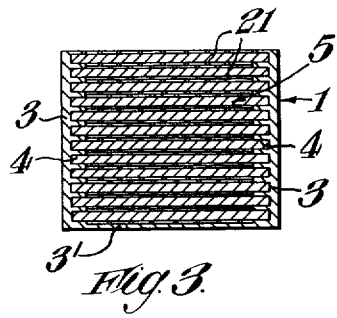
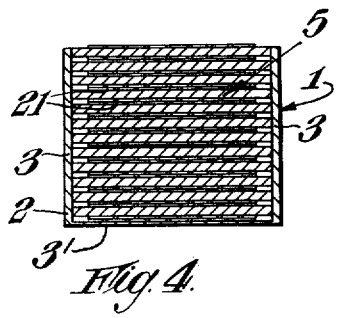
INVENTOR
LESLIE REGINALD BLAKE
BY Lawson and Taylor Oct. 1, 1963   L. R. BLAKE   3,105,807
FUEL ELEMENTS FOR NUCLEAR REACTORS
Filed Jan. 11, 1960   2 Sheets-Sheet 2
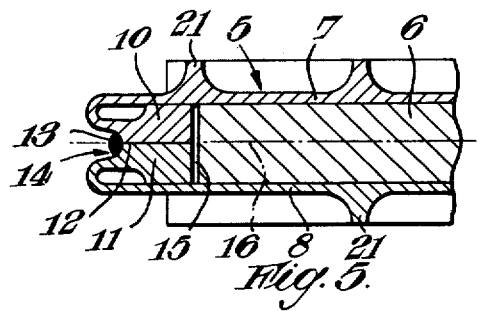
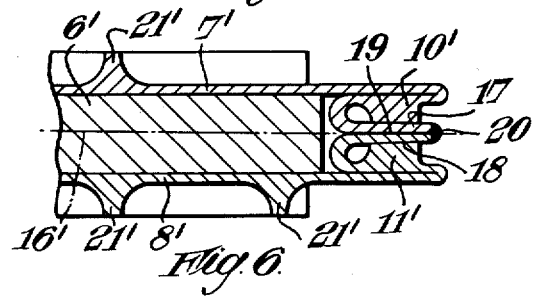
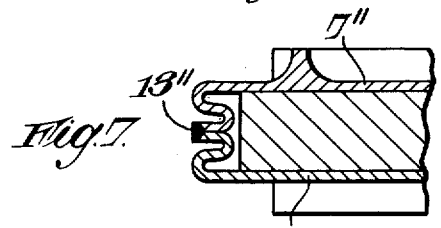
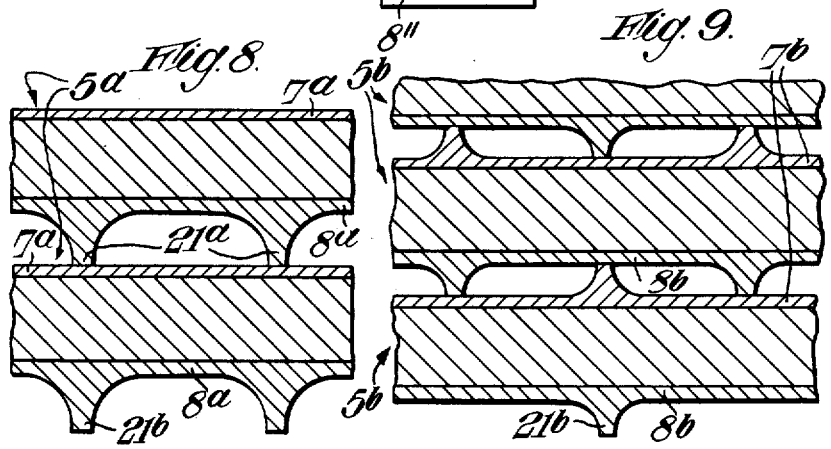
INVENTOR
LESLIE REGINALD BLAKE
BY United States Patent Office 3,105,807
Patented Oct. 1, 1963

3,105,807
FUEL ELEMENTS FOR NUCLEAR REACTORS
Leslie Reginald Blake, Thurso, Caithness, Scotland, assignor to United Kingdom Atomic Energy Authority, London, England
Filed Jan. 11, 1960, Ser. No. 1,609
Claims priority, application Great Britain Jan. 12, 1959
2 Claims. (Cl. 204—193.2)

This invention relates to fuel elements for nuclear reactors.

One of the most serious problems to be faced in designing fuel elements for nuclear reactors is distortion of the fuel due to the creation of fission products within the fuel on irradiation. This distortion may take the form of swelling of the fuel which, if confined by a strong fuel sheath, manifests itself as axial extension of the fuel. From a heat transfer point of view, it is however desirable to make the fuel sheath as thin as possible whilst retaining sufficient strength to be able to withstand thermal cycling and thermal and mechanical shocks occurring on refuelling manipulation. A relatively thin fuel sheath will become distorted on burn-up due to swelling of the fuel as aforesaid, and it is therefore an object of the invention to provide a fuel element in which a certain amount of distortion is permissible whilst minimising problems arising from such distortion, in particular without interfering with coolant flow.

According to the invention, a fuel element for a nuclear reactor has a plate-like fuel member contained in a sheath in intimate contact with the sides of the fuel member, the sheath having one or both of those of its walls which contact the sides of the fuel member provided with outwardly projecting portions of greater wall thickness than that of the remainder of the wall or walls, the said portions serving to space the element from adjacent elements to provide a coolant flow path therebetween whilst allowing of a degree of distortion of the sheath consequent on expansion of the fuel member.

The said portions, where previded on one side wall only of the sheath, may be adapted to contact the side wall of the sheath of an adjacent fuel element which is not provided with the said parts.

Alternatively where both side walls have the said portions, the said portions may be adapted to contact adjacent fuel elements either between the said portions of the adjacent fuel elements or with corresponding portions thereof.

The said portions may be in the form of spaced longitudinal ribs which may be straight or curved.

Clearance is preferably left between the ends of the sheath and the fuel member to allow for endwise growth of the fuel member on irradiation.

According to another aspect of the invention, a fuel element for a nuclear reactor has a plate-like fuel member enclosed by a sheath which is formed in two parts, the side edge portions of each part being turned inwardly and the two parts being secured to one another in such a manner that the turned-in portions function as edge plugs of the sheath which are capable of yielding outwardly on expansion of the fuel member. The sheath of a fuel element so provided may in addition possess projecting portions as aforesaid.

An array of fuel elements according to the invention may be incorporated in a container of a rectangular envelope or box-like form providing a fuel block which is manipulatable into and out of a reactor core. The container may have three or four sides and be open ended.

Various constructional examples embodying the invention will now be described with reference to the accompanying drawings, wherein:

FIGURE 1 is a fragmentary side elevation of a fuel element according to the invention, mounted in a container shown in section, FIGURE 2 is a fragmentary perspective top end view of the fuel element shown in FIGURE 1, FIGURE 2A is a section on line IIA—IIA of FIGURE 2, FIGURE 3 is a plan view in section on line III—III of FIGURE 1, FIGURE 4 is a plan view in section on line IV—IV of FIGURE 1, FIGURE 5 is an enlarged fragmentary plan view, in section on line IV—IV of FIGURE 1, of the fuel element alone, FIGURES 6 and 7 are similar views to FIGURE 5 and illustrate alternative constructions, FIGURE 8 is a similar view to FIGURE 5 showing adjacent fuel elements and another construction, and FIGURE 9 is a similar view to FIGURE 8 and illustrates a further construction.

Referring to the drawings (wherein like reference numerals refer to like parts), in the construction shown in FIGURES 1, 2, 3, 4 and 5 thereof, as applied by way of example to a fuel block suitable for example for incorporation in an assembly frame, a combination of such frames being suitable for forming the core of a fast reactor, the fuel block 1 consists of a box-like container 2 having an open lower end to permit the entry of coolant flowing upwardly from below. The container is of stainless steel and is of square section and opposed walls 3 at the upper and lower regions only are provided with grooves 4 in which fuel elements generally indicated by the reference numeral 5 are nested so as to be supported at top and bottom to allow of a degree of bowing on exposure to temperature and irradiation. There is a third continuous wall 3', the fourth side being open to allow a degree of bowing of fuel elements in the container 2, restricted by the continuous wall 3' of an adjacent container when the fuel blocks 1 are loaded in an assembly frame as aforesaid.

Each fuel element 5 consists of a plate-like fuel member 6 of fissionable material or an alloy thereof, for example a $U_{235}$ or a Pu-based alloy, contained in a sheath formed in two sheet parts 7 and 8, intimately contacting the faces of the fuel member 6 and seam welded together at 9 at their top and bottom ends (see FIGURES 2 and 2A) thereby providing a void 6a allowing for a degree of longitudinal expansion of the fuel member 6 on irradiation. The sheet parts may be of zirconium, niobium, vanadium or any other suitable material. The side edge portions 10, 11 respectively of the parts 7 and 8 (see FIGURE 5) are thickened and are turned inwardly to abut at 12 and a seam weld 13 is effected within a depression 14 formed as a result of the bending. The ends of the edge portions 10, 11 are left just clear of the fuel member 6 and the intervening space 15 is filled either with sodium or inert gas, or is evacuated. It will be appreciated that the clearance 15 together with the yieldable plug formed by the abutting portions 10, 11 allow of expansion of the fuel member outwardly in the direction of its lateral axis illustrated by the dot-and-dash line 16 in FIGURE 5. In an alternative construction, illustrated in FIGURE 6, the parts 7' and 8' of the sheath have thickened portions 10' and 11' respectively which are spaced from the ends of the edge parts, portions 17, 18 respectively of normal thickness being re-turned and abutting at 19 to pass between the portions 10' and 11' and being seam welded on the outside of the sheath at 20. It will be appreciated that the function is similar to that of the construction described with reference to FIGURE 5 and allows for expansion of the fuel member 6' outwardly in the direction of the axis 16'. In a further alternative, illustrated in FIGURE 7, the edges of the parts 7", 8", of the sheath are given concertina-like folds and externally welded at 13", functioning in a similar manner to the construction illustrated with reference to FIGURES 5 and 6.

The outer faces of the parts 7 and 8 (or 7' and 8' or 7" and 8") are formed with curved longitudinal ribs 21 which may be in sections as shown, or be continuous over the whole length of the sheath. The ribs 21 are curved in opposite sense on opposed sides of the sheath, as can be seen in FIGURE 1 wherein opposed side ribs 21 are shown in dotted lines. Adjacent fuel elements 5 thus contact at places where the ribs 21 cross one another, this contacting serving to space the fuel elements 5 and allow a coolant flow path therebetween whilst serving to support them and allow a degree of distortion of the sheath between the ribs 21 to outward expansion of the fuel member 6 in a direction substantially at right angles to axis 16 in FIGURE 5. FIGURES 3 and 4 show how the ribs 21 contact one another. The ribs 21 may be formed during rolling of the sheet material used for forming the parts 7 and 8 (or 7' and 8' or 7" and 8", as appropriate).

Instead of being disposed on both outer faces of the sheath, ribs 21a may be formed on one outer face only, for example, as shown in FIGURE 8, on the outer face of the part 8a only of the sheath. The ribs 21a contact the plain outer face of the part 7a of the next adjacent fuel element 5a, and so on. The ribs 21a are of greater depth than the ribs 21, 21' of FIGURES 5 and 6 so as not to reduce the width of the coolant flow path.

In another alternative, shown in FIGURE 9, ribs 21b are provided on both outer faces of the sheath, that is, on both parts 7b and 8b thereof, but instead of being curved are straight and contact the outer face of adjacent fuel elements 5b between the ribs 21b. Again in this construction, the depth of the ribs 21b is greater than that of the ribs 21, 21' of FIGURES 5 and 6 respectively, to ensure provision of a coolant flow path of ample width.

It will be appreciated that fuel elements as hereinbefore described are advantageous in that fuel growth is permitted without interfering with coolant paths or imposing a serious strain on the sheaths, whereby the normal sheath wall thickness can be made thin for improved heat transfer characteristics. Furthermore, absence of serious straining of the sheaths permits of longer exposure to irradiation and increased burn-up of fuel.

I claim:

1. A nuclear reactor fuel element comprising a plate-like fuel member of rectangular form, a protective sheath formed of two sheet parts within which said fuel member is contained in intimate contact with the inner surfaces of said sheet parts, at least one of said sheet parts having outwardly projecting ribs, said sheet parts being joined together along their end edges respectively to define a space between the end edges of the fuel member and the corresponding edges of the sheath, and said sheet parts having inwardly turned portions along their side edges joined together to form yieldable edge plugs spaced from the side edges of the fuel member.

2. A nuclear reactor fuel element comprising a plate-like fuel member of substantially rectangular form, a protective sheath formed of two sheet parts within which said fuel member is contained in intimate contact with the inner surfaces of said sheet parts, said sheet parts being joined together along their end edges respectively to define a space between the end edges of the fuel member and the corresponding edges of the sheath, and said sheet parts having side edge portions turned inwardly toward, and spaced from, the side edges of the fuel member and joined together respectively.

References Cited in the file of this patent

UNITED STATES PATENTS

| 2,915,815 | Bean et al. | Dec. 8, 1959 |
| 2,999,058 | Wheelock et al. | Sept. 5, 1961 |

FOREIGN PATENTS

| 157,657 | Sweden | Jan. 29, 1957 |
| 768,078 | Great Britain | Feb. 13, 1957 |